(12) United States Patent
Cederwall

(10) Patent No.: US 11,815,645 B2
(45) Date of Patent: Nov. 14, 2023

(54) RADIATION DETECTING SYSTEM AND METHOD

(71) Applicant: KTH Holding AB, Stockholm (SE)

(72) Inventor: Bo Cederwall, Lindingö (SE)

(73) Assignee: KTH HOLDING AB, Stockholm (SE)

( * ) Notice: Subject to any disclaimer, the term of this patent is extended or adjusted under 35 U.S.C. 154(b) by 520 days.

(21) Appl. No.: 17/255,143

(22) PCT Filed: Jun. 25, 2019

(86) PCT No.: PCT/SE2019/050609
§ 371 (c)(1),
(2) Date: Dec. 22, 2020

(87) PCT Pub. No.: WO2020/005142
PCT Pub. Date: Jan. 2, 2020

(65) Prior Publication Data
US 2021/0270993 A1    Sep. 2, 2021

(30) Foreign Application Priority Data

Jun. 25, 2018 (SE) .................................. 1830201-8

(51) Int. Cl.
*G01V 5/00* (2006.01)
*G06N 3/08* (2023.01)
*G08B 21/18* (2006.01)

(52) U.S. Cl.
CPC ............. *G01V 5/0091* (2013.01); *G06N 3/08* (2013.01); *G08B 21/182* (2013.01)

(58) Field of Classification Search
None
See application file for complete search history.

(56) References Cited

U.S. PATENT DOCUMENTS

| 4,482,808 A | * | 11/1984 | Tominaga | ................. G01T 1/40 |
| | | | | 250/392 |
| 2007/0029493 A1 | * | 2/2007 | Kniss | .................... G01T 1/2008 |
| | | | | 250/370.11 |

(Continued)

OTHER PUBLICATIONS

Enqvist et al.; "Measurement and Simulation of Neutron/Gamma-Ray Cross-Correlation Functions from Spontaneous Fission"; Nuclear Instruments and Method in Physics Research A 595; 2008; pp. 426-430.

(Continued)

*Primary Examiner* — Marcus H Taningco
(74) *Attorney, Agent, or Firm* — DILWORTH IP, LLC

(57) ABSTRACT

Radiation from special nuclear materials ("SNM") is analyzed by detecting and sampling gamma rays and fast neutrons. If the amplitude of a recorded gamma ray induced signal or neutron induced signal exceeds a predetermined threshold, signal arrival times, and characteristic pulse shape parameters and/or full integrals of the sampled signals are measured. Based on the signal arrival times, and the characteristic pulse shape parameters and/or the full integrals of the sampled signals, it is determined if a neutron induced signal is recorded within a predetermined time window after a recorded gamma ray induced signal. If so, possible points of origin of the correlated neutron and gamma rays within a field of view are reconstructed. If a rate of events with a neutron-induced signal being recorded within the predetermined time window after a recorded gamma ray signal is higher than a predetermined value above the background rate. An alarm is issued.

9 Claims, 5 Drawing Sheets

(56) References Cited

U.S. PATENT DOCUMENTS

| | | | | |
|---|---|---|---|---|
| 2009/0140150 A1* | 6/2009 | Ivan | ............... | G01T 1/17 250/361 R |
| 2011/0101230 A1 | 5/2011 | Inbar | | |
| 2011/0204243 A1* | 8/2011 | Bendahan | ............... | H01J 40/04 250/367 |
| 2012/0046867 A1* | 2/2012 | Faber | ............... | G01T 1/1611 250/255 |
| 2014/0264058 A1* | 9/2014 | Chandrasekharan | ... | G01T 1/167 250/394 |
| 2014/0270034 A1* | 9/2014 | Clayton | ............... | G01V 5/0091 376/154 |
| 2016/0291196 A1* | 10/2016 | De Vita | ............... | G01V 5/0091 |

OTHER PUBLICATIONS

Trombetta et al.; "Fast Neutron- and γ-ray Coincidence Detection for Nuclear Security and Safeguards Applications"; Nuclear Inst. and Methods in Physics Research, A 927; 2019; pp. 119-124.

Paff et al.; "Radionuclide Identification Algorithm for Organic Scintillator-Based Radiation Portal Monitor"; Nuclear Instruments and Method in Physics Research A 849; 2017; pp. 41-48.

Poitrasson-Rivière et al.; "Dual-Particle Imaging System Based on Simultaneous Detection of Photon and Neutron Collision Events"; Nuclear Instruments and Methods in Physics Research A 760; 2014; pp. 40-45.

Paff et al.; "Organic Liquid Scintillation Detector Shape and Volume Impact on Radiation Portal Monitors"; Nuclear Instruments and Methods in Physics Research A 825; 2016; pp. 31-39.

Paff et al.; "Organic Liquid Scintillation Detectors for On-the-Fly Neutron/Gamma Alarming and Radionuclide Identification in a Pedestrian Radiation Portal Monitor"; Nuclear Instruments and Methods in Physics Research A 789; 2015; pp. 16-27.

Monterial et al.; "Single-View 3-D Reconstruction of Correlated Gamma-Neutron Sources"; IEEE Transactions on Nuclear Science; vol. 64; No. 7; Jul. 2017; pp. 1840-1845.

Paff et al.; "Gamm/Neutron Time-Correlation for Special Nuclear Material Detection—Active Stimulation of Highly Enriched Uranium"; Annals of Nuclear Energy 72; 2014; pp. 358-366.

Extended European Search Report issued in corresponding European Patent Application No. 19825202.5, dated Mar. 2, 2022.

Stevanato, Luca; "Innovative techniques for Non Destructive Analysis"; http://paduaresearch.cab.unipd.it/5465/1/TesiDottorato_Stevanato.pdf.

Monterial, Mateusz et al.; "Multiplication and Presence of Shielding Material from Time-Correlated Pulse-Height Measurements of Subcritical Plutonium Assemblies"; doi: 10.1016/J.NIMA.2017.01.040.

Monterial, Mateusz et al., "Single-View 3-D Reconstruction of Correlated Gamma-Neutron Sources", IEEE Transactions on Nuclear Science, vol. 64, No. 7, Jul. 2017; pp. 1840-1845.

Mueller, J. M. et al., "Neutron and Gamma Ray Coincidence Measurements of a High-Multiplication, Subcritical Assembly of Weapons-Grade Plutonium", 2015 IEEE Nuclear Science Symposium and Medical Imaging Conference; Oct. 31, 2015 to Nov. 7, 2015.

International Search Report issued in corresponding PCT Application No. PCT/SE2019/050609, dated Aug. 30, 2019.

\* cited by examiner

RADIATION DETECTING SYSTEM AND METHOD

TECHNICAL FIELD

The present invention relates to a system and a method for detecting radiation.

BACKGROUND OF INVENTION

In the last decades, in particular following the Sep. 11, 2001 attacks, the threat of a terrorist organization gaining access to a nuclear weapon has become a major safety concern. While the production of special nuclear materials (SNM) requires an infrastructure and knowledge level that is probably not available to such organizations the possibility that existing nuclear weapons or materials come into the wrong hands cannot be ruled out. In order to prevent diversion of existing SNM, efficient material accountability and security measures are required. The present invention is applicable to both passive and active interrogation techniques intended for the detection and identification of SNM. Any system based on the invention described herein will also be well suited for general detection of radioactive materials emitting gamma rays and neutrons.

In order to identify the presence of and characterize SNM, a radiation signature must be identified that distinguishes it from the ambient background radiation or other sources of ionizing radiation. There has been an increased demand for advanced systems involving the detection of neutron radiation, which is one of the characteristic signatures of SNM, especially for security applications like radiation portal monitoring (RPM) systems.

Time-correlated events are a further distinguishing signature of SNM since the background radiation is generally uncorrelated. Time correlation measurements are performed by detecting multiple particles within time windows that are as short as possible in order to avoid false random coincidences. The length of the time window that is applied depends on the type of detector. Neutron-neutron coincidences are known to be useful for detecting SNM. The present invention targets neutron-gamma coincidence detection, which has specific advantages for sensitive detection of SNM for certain applications, which have previously not been recognized.

Due to their very high efficiency for detecting neutrons, He-3 counters represent the current "gold standard" for neutron detection. Therefore, He-3 counters are used in the majority of security and safeguards applications that involve neutron detection. Existing systems are therefore mainly based on detection of moderated slow neutrons, using He-3 proportional counters. Due to the time it takes to moderate the neutrons before detection, typically microseconds, the time window for coincidence detection is also of that order.

Furthermore, time correlations between detected neutrons over longer time scales, known as multiplicity counting, has been widely used to characterize fissile sources. Information about the fissile mass of the sample can be estimated by creating a neutron multiplicity distribution. The neutron multiplicity distribution reflects the time-correlated distribution of detected events from multiple fissions.

Spontaneously fissioning systems present in SNM, primarily Pu-240, are associated with the emission of fast neutrons and "cascades" of high-energy photons, gamma rays, depopulating excited states in the fission products. Most of these gamma rays are "prompt", i.e. emanate from short-lived nuclear states, and their multiplicity distribution can extend significantly beyond an average of 5-10. For typical geometries used in security applications like RPMs for border control of persons and luggage or for personnel working at sites handling SNMs the gamma rays and neutrons will arrive at the detectors within 50 nanoseconds (ns). Compared with standard neutron detection systems using e.g. He-3 counters where the neutrons are moderated before detection the required coincidence window is more than ten times shorter with a correspondingly reduced rate of false, spurious coincidences. The use of detectors sensitive to both fast neutrons and gamma rays may therefore result in a higher sensitivity for detecting SNM, of essence in nuclear safeguards and security applications.

PRIOR ART

The article: Trombetta, D. M., et al., "*Fast neutron- and γ-ray coincidence detection for nuclear security and safeguards applications*", Nuclear Instruments and Methods in Physics Research, A 927 (2019), pp 119-124, describes a technique that involves using short time correlations between gamma and fast neutrons to detect and, under certain conditions, quantify the amount of nuclear material, e.g. plutonium.

The article: Paff, M. G., et al., "*Radionuclide identification algorithm for organic scintillator-based radiation portal monitor*", Nuclear Instruments and Methods in Physics Research, A 849 (2017), pp 41-48, describes an algorithm for on-the-fly radionuclide identification for radiation portal monitors using organic scintillation detectors.

The article: Paff, M. G., et al., "*Organic liquid scintillation detectors for on-the-fly neutron/gamma alarming and radionuclide identification in a pedestrian radiation portal monitor*", Nuclear Instruments and Methods in Physics Research, A 789 (2015) pp 16-27, describes experimental results from a radiation portal monitor based on the use of organic liquid scintillators, however, without using coincidences.

The article: Paff, M. G., et al., "*Organic liquid scintillation detector shape and volume impact on radiation portal monitors*", Nuclear Instruments and Methods in Physics Research, A 825 (2016), pp 31-39, describes a similar setup as the previous article.

The article: Enqvist, A., et al., "*Measurement and simulation of neutron/gamma-ray cross-correlation functions from spontaneous fission*", Nuclear Instruments and Methods in Physics Research, A 595 (2008), pp 426-430, describes how well known time correlations between particles emitted in spontaneous fission are measured for instance, in relation to the areas of nuclear nonproliferation and homeland security.

The article: Monterial, M., et al., "*Single-View 3-D Reconstruction of Correlated Gamma-Neutron Sources*", IEEE TRANSACTIONS ON NUCLEAR SCIENCE, VOL. 64, NO. 7, July 2017, pp 1840-1845, describes a method of 3-D image reconstruction of neutron sources that emit correlated gamma rays and neutrons, like SNM. The technique uses gamma-neutron-neutron coincidence measurements to perform the 3-D reconstruction of the source. The described method uses neutron double scattering in order to kinematically reconstruct conical surface of possible source locations. By including the time to a correlated gamma it then further constrains the source location in three-dimensions by solving for the source-to-detector distance along the surface of the cone.

The article: Poitrasson-Rivière, A. et al. "*Dual-particle imaging system based on simultaneous detection of photon*

*and neutron collision events*", Nuclear Instruments and Methods in Physics Research, A 760 (2014), pp 40-45, describes a gamma and neutron imaging system where the gamma rays are processed using Compton scattering and the neutrons are processed using double-scatter imaging. In both cases the possible directions of origin are on a cone for which the angle is deduced from the scattering process. The system processes gamma rays and neutrons independently and does not use gamma-neutron coincidences.

The article: Paff, M. G., et al., "*Gamma/neutron time-correlation for special nuclear material detection—Active stimulation of highly enriched uranium*", Annals of Nuclear Energy, 72 (2014), pp 358-366 describes how n-gamma correlations are used in material analyses related to SNM.

US 2018/0336976 discloses a method for obtaining fast neutron and gamma ray quantities in an unknown neutron and gamma ray mixed field. The method is comprised of the steps (1) a radiation detector capable of measuring neutrons and gamma rays, (2) identification of the neutron and the gamma ray interactions based on digital pulse shape analysis, (3) formation of a pulse height (or pulse area) histogram for both neutron and gamma ray events, (4) conversion of the neutron and gamma ray pulse height (or pulse area) histogram into a quantity of interest such as count rate, energy spectra, kerma, absorbed dose, and dose equivalent, for both instantaneous and integral readings, and (5) steps (2-4) occurring in real-time.

Hence, inter alia, as discussed above fast-neutron coincidence measurements have potential advantages compared to thermal and epithermal neutron counters, the most important being the much shorter required coincidence time and the correspondingly reduced rate of background due to accidental coincidences as mentioned above. It is well known in the art of radiation detection that a detector system based on organic scintillation detectors is sensitive to both fast neutrons and gamma rays and can be used to distinguish between the two types of radiation using the principles of pulse shape discrimination. It has also been shown that a detection system based on fast-neutron coincidence counting can be as efficient as standard high-level neutron coincidence systems based on He-3 counters for neutron-neutron-coincidence detection. The present system and method overcomes limitations in the existing state of the art and exploits fast neutron-gamma coincidences for highly selective identification, quantification and imaging of SNM.

DETAILED DESCRIPTION

The present invention relates to a method and detection system for ionizing radiation suitable for standard radiation portal imaging applications and, in addition, is capable of identifying small amounts of SNM containing Pu-240 and other spontaneously fissioning nuclides by measuring the gamma-fast neutron coincidence rate. The system and method can also provide information on the location of SNM within the field of view (FOV) of the detection system by measuring the accumulated gamma-neutron arrival time difference spectra for different combinations of detector elements, and provide additional independent information on the location of SNM by measuring the arrival time differences and neutron interaction energies for each gamma-neutron coincidence event and reconstructing the possible points of origin. It is the almost simultaneous (i.e. events occurring very close in time, on a scale of the order of less than 1 nanosecond) emission of neutrons and gamma rays that is the distinguishing feature of SNM containing spontaneously fissioning nuclides that is used in the present invention for identifying such materials, in addition to detection of gamma radiation from conventional radioactive sources. Both neutrons and gamma rays are penetrating radiation and can readily be detected even if moderate amounts of shielding material are present between source and detector.

Figure 1:
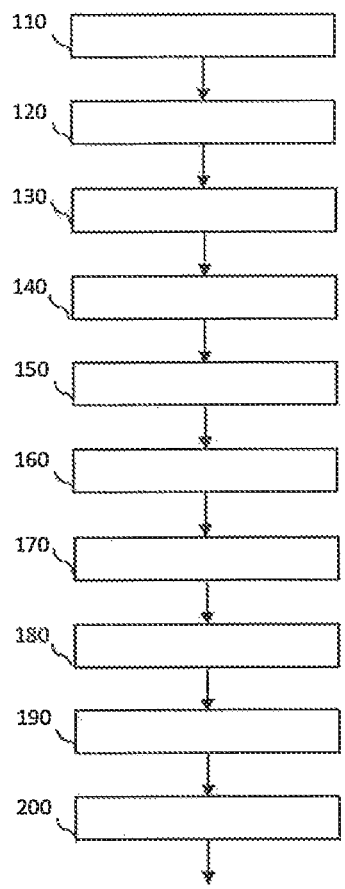
FIG. 1 illustrates an embodiment of a radiation detection method, in accordance with the present invention.

FIG. 1 shows an embodiment of a radiation detection method implemented by at least two radiation detectors. The detectors are sensitive to fast neutrons and gamma rays. Radiation detectors suitable for this purpose are for example organic scintillation detectors and the invention shall hereafter be described based on such a system of detectors for which the radiation-induced signals are processed using high-speed digitizers, which enable fast on-line characterization of said signals. However, the invention will apply to any other suitable system of radiation detectors capable of detecting fast neutrons and gamma rays with a good time resolution, of the order of 1 ns.

The detector signals may have different properties such as pulse shape properties for neutrons and gamma rays making it possible to distinguish between the two types of radiations event by event. The radiation detection method may be utilized in RPMs where there is an interest to detect the presence of SNM in addition to the detection of conventional ionizing radiation sources, such as radioactive materials emitting gamma rays. A region of interest may also be in nuclear safeguards applications. In each case, the detector system will be able to identify the presence of radioactive materials, in particular SNM, within its FOV, to provide information on the location of such materials within the FOV, as well as providing information on the amount of SNM within the FOV.

The method comprises sampling 110 the signals of the detectors in synchronization with a common clock signal at a sampling rate above 100 MHz, for example by using a 250 MHz CAEN VX1720 digitizer module to acquire pulse waveforms from the detectors. The high-speed sampling of the signals from the organic scintillation detectors serves to determine the arrival times of the radiation incident on the detectors, the values of parameters, which are characteristic of the signal pulse shapes, and the total integral of the pulses that corresponds to the energy deposited by the incident radiation. The pulse shapes of signals from organic scintillation detectors are well known in the art to be different for gamma-ray-induced signals and neutron-induced signals, the former being shorter in duration for a given amplitude. Hence, by comparing e.g. the ratio of the total charge integral of a detector pulse over the charge integrated over the tail of the pulse, gamma-ray induced signals will group themselves in a higher range than neutron-induced signals.

Gamma rays and neutrons can be distinguished from each other in this way with a false rate less than typically a few per mil. The pulse shape information that distinguishes neutron-induced signals from gamma-ray induced signals can, e.g. also be extracted using traditional analog electronics, with circuits or with ADCs, time-to-digital converters (TDCs) etc. as is well known in the art.

The method comprises recording 120 the signals induced by gamma rays and neutrons if the amplitude of the signals exceed predetermined threshold values and measuring 130 the signal arrival times of the sampled signals, respectively. This is done by determining at what times the detector signals surpass a certain amplitude threshold, so called leading edge timing, or via more advanced procedures like constant fraction discrimination. Such methods are well known in the art and a time resolution of around 1 ns can readily be achieved for standard organic scintillation detectors.

The method then comprises determining 140, based on the signal arrival times, and preferably based at least one of the characteristic pulse shape parameters and the full integrals of said sampled signals. Typically, radioactive materials and nuclear materials emit gamma rays suitable for detection. Fission of certain isotopes present in a nuclear material within the region of interest will emit multiple gamma rays and around two fast neutrons with mean energy around two MeV per event.

There are many different ways to determine 140 the characteristic pulse shape parameters and the signal arrival time. If the signals are recorded using high-speed digitizers (sampling frequency 100 MHz), which is the preferred choice, there is a large flexibility to design algorithms for these purposes. For example, parameters i)-iii) below can be used for pulse shape discrimination between neutrons and gamma rays and the time at detection threshold determined as iv).

i) Qtot—signal integrated over full determined time period of signal
ii) Qtail—signal integrated over a fraction at end of time period of signal
iii) A—maximum amplitude of signal
iv) The time of arrival of the signal can be determined by measuring when the signal amplitude exceeds a predetermined detection threshold. The detection threshold is set so as to be above the electronic noise level. If a digitizer is used, interpolation between sampling points in time will improve the accuracy. A more accurate determination of the signal arrival time employs constant fraction discrimination, either analog or digital.

In exemplary embodiments, the method comprises determining if a gamma ray or neutron was recorded in the detector by applying relevant conditions on the pulse shape parameters determined, for example a certain range of the ratio Qtot/Qtail, Qtot/A, or combinations of Qtot/Qtail and A.

If the parameters are within a first predetermined region of pulse shape parameter space it is determined that a neutron has induced the signal, and if the parameters are within a second predetermined region of pulse shape parameter space it is determined that a photon has induced the signal.

When a neutron-induced signal is determined in one detector within a certain short predetermined time interval after the time of arrival of a signal determined to be induced by a gamma ray in another detector, a fast neutron-gamma coincidence is recorded. This time interval is typically between 2 nanoseconds and 100 nanoseconds for a system with distances between possible source positions and detectors from a few centimeters up to around 1 meter (i.e. typical dimensions of RPMs for surveillance of persons or luggage in e.g. border control systems) and is essentially proportional to the maximum of such distances afforded by the geometry of the detector system. Hence, for larger systems (e.g. monitoring of vehicles etc the time interval is correspondingly extended in proportion to the distances involved).

Since the velocity of light is much higher than the velocity of the fast neutrons emitted from fission reactions the maximum time difference between correlated gamma rays and neutrons is mainly determined by the time of flight of the neutrons and limited by the low-energy detector thresholds for fast neutrons and the dimensions of the detector system. Minimum time difference, i.e. the lower end of the time interval, should be just long enough to avoid that gamma-gamma coincidences, which are accidentally considered as gamma-neutron coincidences due to imperfections in the pulse shape discrimination, are not recorded as true gamma-neutron coincidences. The rate of detected gamma-neutron coincidence events with time differences between neutrons and gamma rays in the range between the above mentioned predetermined minimum and maximum values of typically 2-100 ns for a standard pedestrian RPM geometry is then an indicator of the presence of SNM within the FOV of the detector system.

When the recorded gamma-neutron coincidence rate as defined above exceeds a certain predetermined threshold the presence of a nuclear material undergoing spontaneous fission is indicated. There are several advantages in this way to detect SNM. By using fast coincidences and not coincidences between moderated neutrons as is the case in the current state of the art, the rate of accidental coincidences is reduced dramatically due to the much shorter coincidence time. Furthermore, to enhance the sensitivity significantly, the present invention uses the characteristic short time delay between a detected gamma ray and a detected neutron from the same fission event. In addition, by using gamma rays in coincidence with neutrons, the detection rate may be significantly higher than for the currently used neutron-neutron coincidence techniques due to the high multiplicity of gamma rays emitted in fission. If significant amounts of shielding material is present between the SNM and the detectors that suppresses the gamma-ray flux the neutron singles and coincidence rates can still be used as indicators of the presence of SNM as in current commercial systems. Gamma-fast neutron coincidence counting is also less sensitive to the effects of shielding materials that attenuate the flux of fast neutrons, like water or HDPE, than neutron-neutron coincidence counting.

In exemplary embodiments, the method further comprises determining the amount of nuclear material in the region of interest. Moreover, for accurate determination this may benefit from additional knowledge of sample geometry and structure, e.g. from an X-ray scan.

In exemplary embodiments, the method further comprises determining the total gamma ray and neutron rates as well as their cumulative energy and gamma-gamma, gamma-neutron and neutron-neutron coincidence time spectra. In further embodiments, this information may be used to trigger alarms or other notification for any radioactive material emitting gamma rays and/or neutrons. The relative intensities of neutron singles, gamma-ray singles, neutron-neutron and gamma-neutron coincidence rates also provide means to assess the presence of shielding materials.

In exemplary embodiments, the method, implemented by several detectors, comprises measuring and storing spectra of coincidence times between a photon interacting in one of the detectors and a neutron in the other detector for different combinations of detector pairs.

For a given pair of detectors for which gamma rays have been detected in the first detector in coincidence (i.e. typically within 2-100 ns as discussed above) with neutrons detected in the second detector, the time difference spectrum will depend both on the energy distribution of the fission neutrons (which is essentially known) and on the spatial distribution of nuclear material within the region of interest undergoing spontaneous fission relative to the positions in space of the detectors constituting each pair. Hence, it can be used to derive information on the location of SNM within the FOV. The total number of unique coincidence time spectra for a system consisting of N detectors placed at different positions relative to the FOV is hence N(N−1). Each time difference spectrum carries detailed information about the distribution of nuclear material within the FOV, as well as other materials attenuating the radiation.

Prior to measuring on unknown samples, the response of each detector pair is calibrated so that its two characteristic neutron-gamma time spectra (depending on which detector was hit by a gamma ray and which detector was hit by a neutron) for a point-like fission source are known for all points within the FOV. This is the position-dependent response function for each detector pair. The combined response functions from all pairs form the basis for the image reconstruction. They are typically determined only once after the assembly of the detector system and later only periodically for checking system functionality.

The 3D image of the position or spatial distribution of a nuclear material present within the FOV can be reconstructed from the set of acquired time spectra using for example iterative maximum likelihood or other imaging methods adapted from the fields of medical imaging, based on the detector system coincidence time response functions. Methods that can be used to reconstruct the position or spatial distribution of a source emitting gamma rays and neutrons from spontaneous fission using the above mentioned cumulative time difference spectra are also well known in the art of machine learning. For example, an artificial neural network could be trained to perform such a task using time difference spectra acquired with known placements of the SNM in the field of view. Additionally, the image reconstruction can be aided and improved by including information from X-ray imaging of the FOV in case this is possible.

In exemplary embodiments, the method comprises measuring and storing the energy deposited by the neutron, and the neutron-gamma coincidence time differences for each correlated gamma-neutron coincidence pair "event by event". The method comprises utilizing the measured deposited energy of the neutron to estimate its initial velocity and determining the possible points of origin of the corresponding fission event surrounding the detector detecting the neutron by comparing the time difference between neutron and gamma ray and the initial velocity estimated for the neutron. A neutron that is detected in an organic scintillation detector mainly deposits energy in the detector by elastic scattering on protons. The amount of energy deposited is a continuous distribution starting from the full initial energy down to zero. This is folded with the detector response function, including the neutron detection energy threshold, to provide the measured energy distribution. The estimation of the initial neutron velocity, event by event, can then be made based on this known distribution of measured energies as a function of initial neutron energy. As an example, an estimate of the initial neutron energy can be that which for a large number of events would produce a measured energy distribution in the detector for which the center coincides with the measured neutron energy, taking into account the neutron energy detection threshold.

The neutrons from spontaneous fission have a velocity of around 7% of the speed of light on average so the arrival time differences between neutrons and gamma rays are dominated by the neutron time-of-flight. The estimated traveled distance for the neutron is then given by:

$$r_n = \left(\Delta t + \frac{r_\gamma}{c}\right) \cdot v_n \approx \Delta t \cdot v_n$$

where
$r_n$ is the distance traveled by the neutron from the emission point to the detector by which it is detected, $r_\gamma$ is the distance traveled by the gamma ray from the emission point to the detector by which it is detected, $\Delta t$ is the measured time difference between the detection of the gamma ray and the neutron, c is the velocity of light, and $v_n$ is the velocity of the neutron which is estimated from the measured energy deposited by the neutron in the following way.

Assuming that the energy deposition of the neutrons in the organic scintillator is mainly due to elastic scattering on protons the probability of detecting a certain energy is close to a flat distribution between the detector energy threshold for neutrons and the initial kinetic energy of the neutron incident on the detector. Hence, a reasonable estimate of the initial neutron velocity, $v_n$, is given by:

$$v_n = \sqrt{2\left(\frac{2E_m - E_c}{m_n}\right)}$$

where $E_m$ is the measured neutron energy, $E_c$ is a neutron detected energy correction, and $m_n$ is the neutron mass.

In exemplary embodiments, the method comprises reconstructing the 3D image of the distribution of SNM by superimposing all spheres with radius $r_n$ that have been deduced event by event around each detector that was hit by a neutron and performing image processing by filtering etc if needed according to standard methods used e.g. in medical imaging. More detailed estimations of the spatial distribution of SNM can be made using the detailed neutron detection response function for each detector and by including attenuation corrections in the analysis. The amount of SNM within the FOV can also be quantified using this information and the predetermined detection efficiencies for gamma rays and neutrons, possibly with the additional aid of other imaging modalities like X-ray imaging.

Figure 2:
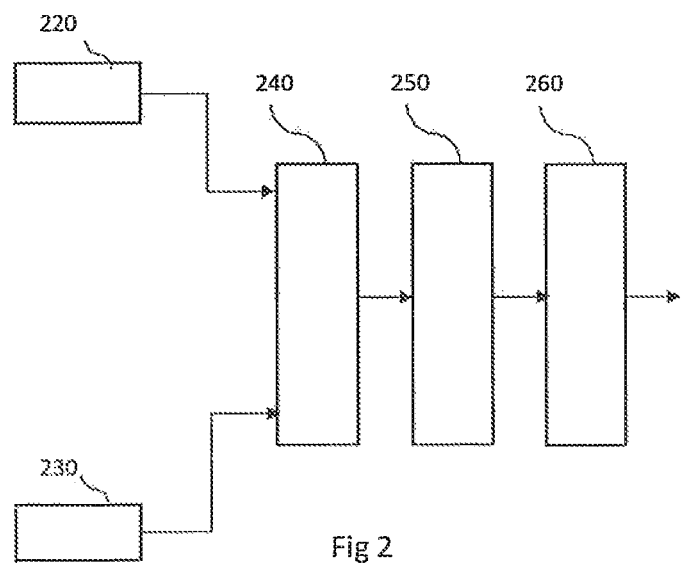
FIG. 2 illustrates an embodiment of a radiation detection system, in accordance with the present invention.

FIG. 2 shows an embodiment of a radiation detecting system comprising a first detector 210 and a second detector 220 arranged to detect gamma rays and fast neutrons and to sample the detected signals. Detectors 210 and 220 may be sensitive to both neutrons and gamma rays. The system comprises means 230 arranged to sample said signals in synchronization with a common clock signal at a sampling rate above 100 Mhz. It further comprises means 240 arranged to record said gamma ray induced signals and neutron induced signals. Furthermore the system comprises processing means 250 arranged to process sampled signals if either said sampled detected gamma ray signals or said sampled detected neutron induced signals exceed predetermined threshold values. It is further arranged to measure and record characteristic pulse shape parameters, signal arrival times, and full integrals (energies) of said sampled signals, and arranged to determine based on the measured pulse shape parameters and signal arrival times whether a neutron-induced signal is recorded within a predetermined time window after a recorded gamma ray signal. The processing means 250 may contain processing circuitry in the form of a field programmable gate array (FPGA).

A digitizer is usually a system that includes a fast sampling analog-to-digital converter (ADC), a flash ADSC, an FPGA etc., which via firmware programming can determine signal arrival times, by means of for example leading edge discrimination, integrate a pulse over different time intervals, establish pulse shape parameters etc.

The CAEN DT5730 digitizer, which samples and processes continuously a number of signals in parallel with 14 bit resolution, 500 MHz constitutes one example of such a digitizer that can be employed according to the invention.

Furthermore, the system comprises processing means arranged to determine whether the rate of events with a neutron induced signal being recorded within a predetermined time window after a recorded gamma ray signal is higher than a predetermined rate above the background rate and then issuing alarm or other notification for the presence of SNM.

Furthermore the system comprises processing means arranged to reconstruct and store the possible points of origin of the material emitting the coincident neutrons and gamma rays event by event based on the measured energies and neutron-gamma time differences and on the information of which detector element was hit by a neutron and which detector element was hit by a gamma ray.

Furthermore the system comprises processing means arranged to reconstruct the spatial distribution of material emitting the coincident neutrons and gamma rays based on the possible points of origin stored event by event, possibly combining with external input like e.g. from an X-ray image of the FOV.

Furthermore the system comprises processing means arranged to reconstruct the spatial distribution of material emitting the coincident neutrons and gamma rays based on the stored cumulative neutron-gamma time difference distributions and the associated information about which detector was hit by a gamma ray and which detector was hit by a neutron, respectively, possibly combining with external input like e.g. from an X-ray image of the FOV.

Furthermore, the system comprises processing means arranged to quantify the amount of SNM within the FOV based on the above-obtained information on the spatial distribution of material emitting the coincident neutrons and gamma rays and predetermined detection efficiencies.

In exemplary embodiments, the system is adapted to implement the above described radiation detection method.

Figure 3:
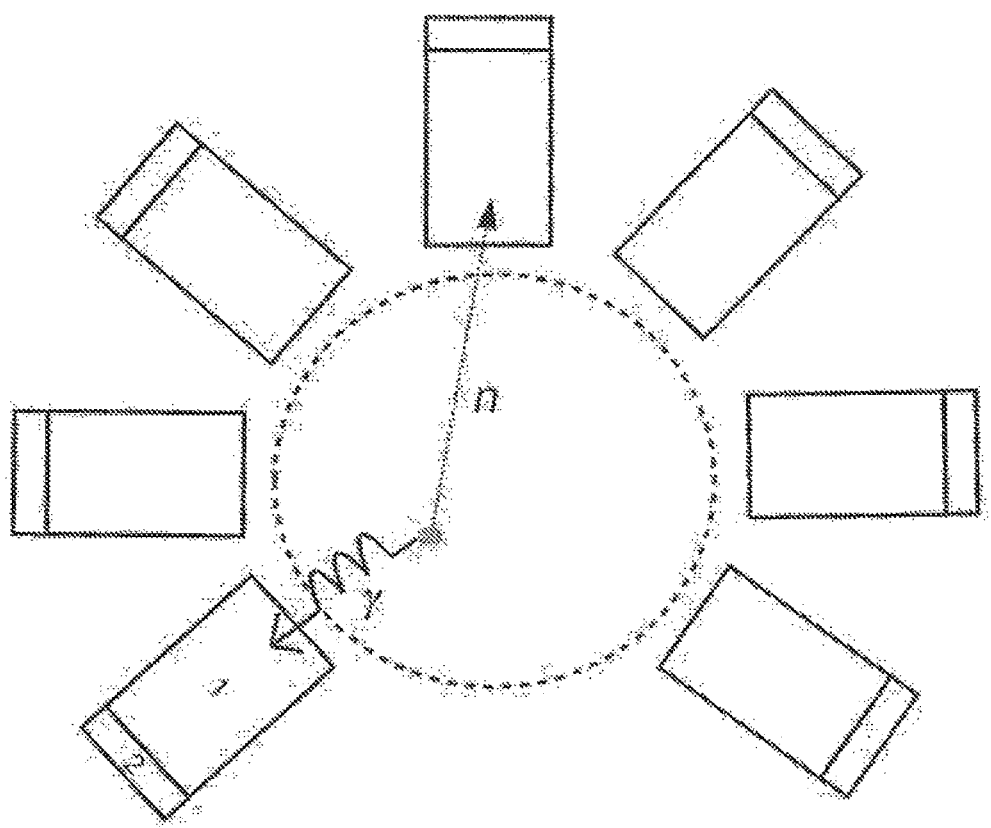
FIG. 3 illustrates a generic setup of a radiation detection system, in accordance with the present invention.

FIG. 3 shows a basic generic setup of a radiation detection system related to the present invention. It consists of radiation detectors sensitive to neutrons and gamma rays placed around a target area, e.g. for an RPM (although the system also is sensitive to points outside the area, i.e. the FOV is extended beyond the target region).

An organic scintillator 1 detector is used to produce light in response to gamma rays and/or neutron interactions, and a sensor 2 is used for optical readout of the scintillation light produced in the detector 1. The optical readout can be based e.g. on photomultiplier tubes, photodiode arrays or silicon photomultiplier arrays.

Method Embodiment

Referring again to FIG. 2, according to one embodiment of the invention, a radiation detecting method is implemented by at least two radiation detectors. Here, at least one first detector D1 is arranged to detect a gamma ray signal and to sample the detected gamma ray induced signal and at least one second detector D2 is arranged to detect fast neutrons and to sample the detected neutron induced signal. The method comprises:

sampling 110 said signals in synchronization with a common clock signal at a sampling rate above 100 Mhz, recording 120 said gamma ray induced signal and neutron induced signal, if the amplitude of said recorded gamma ray signal or of said recorded neutron induced signal exceed predetermined threshold values the method comprising measuring 130 characteristic pulse shape parameters, signal arrival times and full integrals of said sampled signals determining 140 based on the measured signal arrival times or a combination of the pulse shape parameters and signal arrival times whether a neutron induced signal is recorded within a predetermined time window after a recorded gamma ray signal.

if a neutron induced signal is recorded within a predetermined time window after a recorded gamma ray signal reconstruct and store 150 possible points of origin of the neutron and gamma ray within the FOV based on the measured energy deposited by the neutron and the measured neutron-gamma time difference.

if a neutron induced signal is recorded within a predetermined time window after a recorded gamma ray signal store 160 the measured neutron-gamma time difference and the information about which detector was hit by a gamma ray and which detector was hit by a neutron, respectively.

Determining 170 whether the rate of events with a neutron induced signal being recorded within a predetermined time window after a recorded gamma ray signal is higher than a predetermined value above the background rate and then issuing alarm for the presence of SNM.

Reconstructing 180 the spatial distribution of material emitting the coincident neutrons and gamma rays based on the stored 150 possible points of origin stored event by event, possibly combining with external input like e.g. from an X-ray image of the FOV.

Reconstructing 190 the spatial distribution of material emitting the coincident neutrons and gamma rays based on the stored 160 neutron-gamma time differences and the associated information about which detector was hit by a gamma ray and which detector was hit by a neutron, respectively, possibly combining with external input like e.g. from an X-ray image of the FOV.

Quantifying 200 the amount of SNM within the FOV based on the above obtained information on the spatial distribution of material emitting the coincident neutrons and gamma rays and predetermined detection efficiencies.

System Embodiment

According to one embodiment of the invention, a radiation detecting system comprises:
- a first detector D1 arranged to detect a gamma ray and to sample the detected gamma ray signals,
- a second detector D2 arranged to detect fast neutrons and to sample the detected neutron induced signals,
- means arranged to sample said signals in synchronization with a common clock signal at a sampling rate above 100 Mhz
  - means arranged to record said gamma ray induced signals and neutron induced signals
- processing means arranged to
  - process sampled signals if either said sampled detected gamma ray signals or said sampled detected neutron induced signals exceeds a predetermined threshold value,
  - measure signal arrival times, and preferably characteristic pulse shape parameters and/or full integrals of said sampled signals
  - determine based on signal arrival times, and preferably based on the characteristic pulse shape parameters and/or full integrals of said sampled signals whether a neutron induced signal is recorded within a predetermined time window after a recorded gamma ray signal.
  - determine the rate of events when a neutron induced signal is recorded within a predetermined time window after a recorded gamma ray signal and determine whether said rate is significantly above the expected rate of background events without SNM present in the FOV, and if so issue alarm or other notification of the above.
  - perform image reconstruction of the spatial distribution of material emitting coincident gamma rays and neutrons within the FOV based on accumulated neutron-gamma time difference spectra labeled by which detector was hit by a gamma ray and which detector was hit by a neutron and on information of neutron energies and neutron-gamma time differences measured event-by-event, possibly using in addition external input from e.g. an X-ray image of the FOV.
  - quantify the amount of SNM within the FOV based on the above obtained information on spatial distribution and predetermined detection efficiencies.

Figure 4:
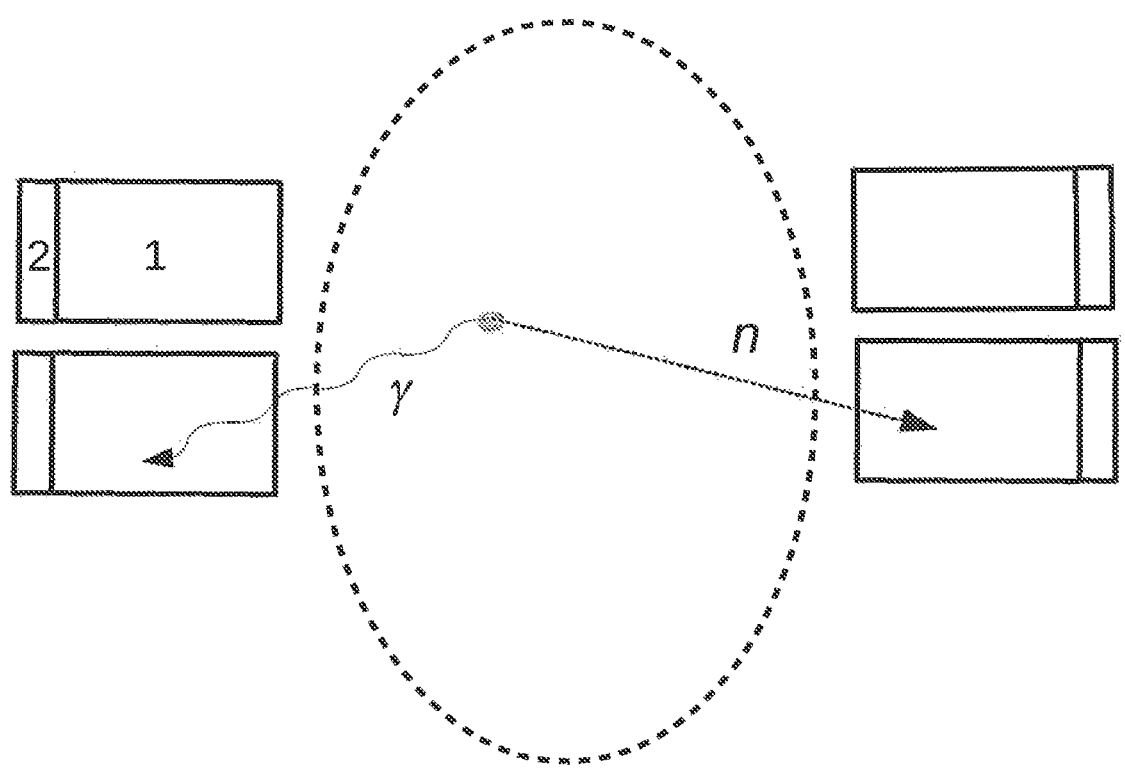
FIG. 4 illustrates a basic setup of radiation detectors around a target area, in accordance with the present invention.

FIG. 4 shows a basic configuration according to one embodiment of the invention, where radiation detectors sensitive to neutrons and gamma rays are arranged around a target area schematically indicated via a dashed line. The target area may form part of a radiation portal monitor (RPM). Naturally, the system is also sensitive outside the target area, since gamma rays and neutrons are penetrating radiation. However, the system has its primary field of sensitivity within the target area.

A detector 1, e.g. an organic scintillator, contains detection material, which is sensitive to neutrons and gamma rays with sufficiently good timing properties and efficiency. A photo detector 2 (or optical readout means) is used to convert the scintillation light from the detector material into a measurable electrical signal. To this aim, the photo detector 2 may include a photomultiplier tube, a photodiode array, silicon photomultiplier array etc. Alternatively, according to another embodiment of the invention, the detector material is not of scintillator type. In such a case, an electric contact connected with the detector material is used instead of the photo detector 2.

The oval spot inside the detector system indicates a fission event, e.g. originating from a plutonium-240 nucleus. Only one gamma ray (out of on average 5-10 emitted in such an event) and one neutron (out of on average around two to three emitted in such an event) are shown. Each of them hits and interacts with a detector. The timing of the signals from the detectors is determined using principles well known in the art, e.g. using the technique of constant fraction discrimination (CFD). The detector signals may also preferably be analyzed with respect to their pulse shapes in order to distinguish detected gamma rays from neutrons. This so called pulse shape discrimination (PSD) of neutrons and gamma rays using organic scintillation detectors is well known in the art and described e.g. in Knoll, Radiation Detection and Measurement, Wiley 2010. The detection of at least one neutron and at least one gamma ray within a characteristic time window (typically around 100 ns for a detector system geometry with dimensions of around 1 m) is the trigger for a fission event and hence if the trigger rate exceeds the (very low) background rate the system will signal that special nuclear material is present within its sensitive region. The detection system can also continuously record single gamma rays and neutrons and measure their flux as in standard RPM applications.

Figure 5:
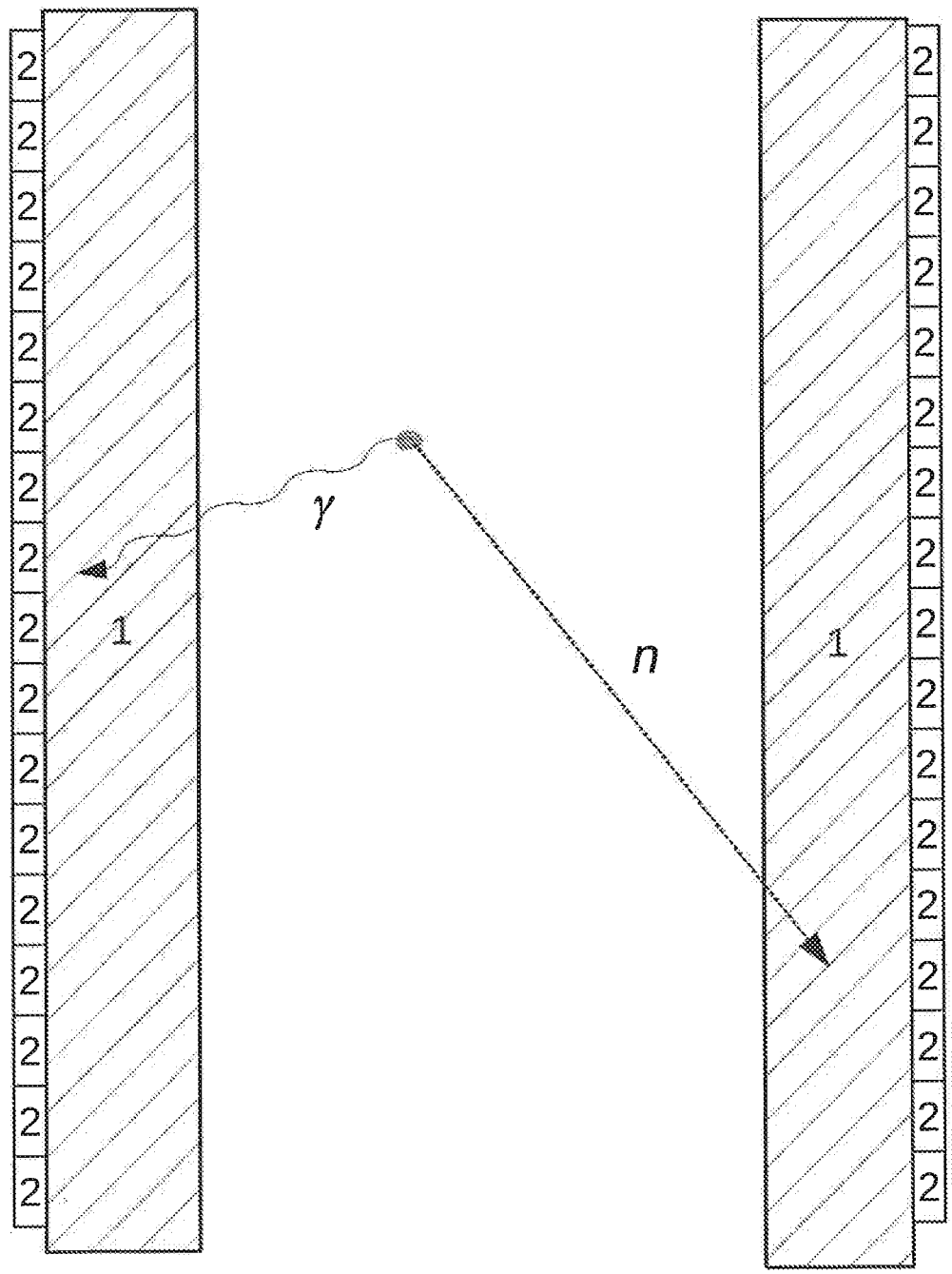
FIG. 5 shows one embodiment according to the invention with an RPM geometry configured to scan a pedestrian area, in accordance with the present invention.

FIG. 5 illustrates one embodiment of the invention, where the detectors are configured to scan a pedestrian zone, or area. FIG. 5 shows an RPM system geometry as seen from the front side as viewed by a subject entering the system. The system contains two slabs of organic scintillators (e.g. plastic scintillators) or two tanks of liquid organic scintillator, where the signals are read out by arrays of photo detectors. The positions and deposited energies from the interactions of neutrons and gamma rays are determined in the same way as in an Anger camera (gamma camera) which is well known in the art of medical imaging. The locations of the interaction points in the detectors can be found by calculating a mean position from the weighted position of each photo detector as determined by the strength of its signal. The total sum of the integrated signal charges from all photo detectors is proportional to the energy of the interaction.

Figure 6:
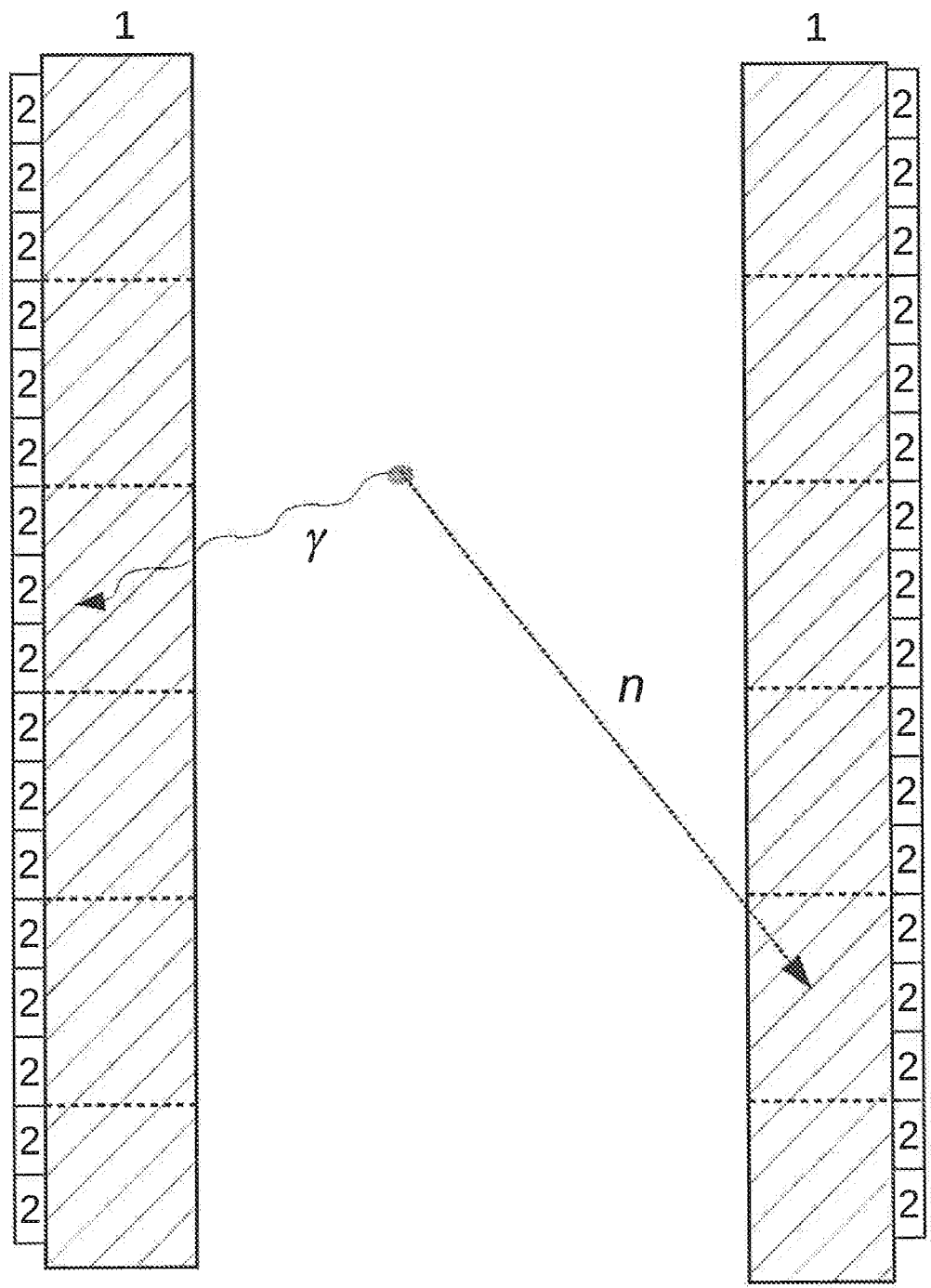
FIG. 6 shows a variant of the embodiment of FIG. 5, where the detector units are subdivided into smaller volumes, in accordance with the present invention.

FIG. 6 shows a variant of the embodiment illustrated in FIG. 5, where the detector units, e.g. in the form of slabs or tanks, are subdivided into smaller volumes by optically reflective material. This is beneficial, since the optically reflective material reduces the interference between two or more interactions in the same detector occurring close in time to one another.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

What is claimed is:
1. A method for detecting radiation using at least two radiation detectors, wherein at least one first detector of said at least two radiation detectors is arranged to detect gamma rays and to sample detected gamma ray induced signals and at least one second detector of said at least two radiation detectors is arranged to detect fast neutrons and to sample detected neutron induced signals, the method comprising:

sampling said detected signals in synchronization with a common clock signal at a sampling rate above 100 Mhz, recording said gamma ray induced signals and neutron induced signals, and if an amplitude of a signal of said recorded gamma ray induced signals or of said recorded neutron induced signals exceeds predetermined threshold values, the method comprises:

measuring signal arrival times of said sampled signals, and preferably at least one of characteristic pulse shape parameters and full integrals of said sampled signals, determining, based on the signal arrival times, and based at least one of the characteristic pulse shape parameters and the full integrals of said sampled signals, if a gamma ray or a neutron is recorded within a predetermined time window after another gamma ray or neutron whether a neutron induced signal is recorded within a predetermined time window after a recorded gamma ray signal, if a neutron induced signal is recorded within the predetermined time window after a recorded gamma ray signal, reconstructing and storing possible points of origin of the neutron and gamma ray within a field of view ("FOV") based on measured energy deposited by the neutron and the measured neutron-gamma time difference, if a neutron induced signal is recorded within the predetermined time window after a recorded gamma ray signal, storing the measured neutron-gamma time difference and information about which detector of said at least two radiation detectors that was hit by a gamma ray and which detector of said at least two radiation detectors that was hit by a neutron, respectively, determining whether a rate of events with a neutron induced signal being recorded within a predetermined time window after a recorded gamma ray signal is higher than a predetermined value above the background rate, and if so issuing an alarm indicating the presence of special nuclear materials ("SNM").

2. The method according to claim 1, further comprising: reconstructing a spatial distribution of material emitting coincident neutrons and gamma rays based on said stored possible points of origin stored event by event.

3. The method according to claim 2, further comprising: quantifying an amount of SNM within the FOV based on the information on the spatial distribution of material emitting the coincident neutrons and gamma rays and predetermined detection efficiencies.

4. The method according to claim 1, further comprising: reconstructing a spatial distribution of material emitting coincident neutrons and gamma rays based on said stored neutron-gamma time differences and the associated information about which detector of said at least two radiation detectors that was hit by a gamma ray and which detector of said at least two radiation detectors that was hit by a neutron, respectively.

5. The method according to claim 1, further comprising: reconstructing at least one of a position and a spatial distribution of a source emitting time correlated gamma rays and neutrons using an artificial neural network trained on cumulative time difference spectra acquired from at least one known position of at least one SNM or other nuclear source of time-correlated gamma rays and neutrons in the FOV.

6. A radiation detecting system comprising:
a first detector configured to detect gamma rays and to sample detected gamma ray induced signals,
a second detector configured to detect fast neutrons and to sample detected neutron induced signals,
a digitizer configured to sample said signals in synchronization with a common clock signal at a sampling rate above 100 Mhz,
a digital memory configured to record said gamma ray induced signals and neutron induced signals,
a processing circuitry configured to:
process the sampled signals if at least one of said sampled detected gamma ray induced signals or said sampled detected neutron induced signals exceeds a predetermined threshold value,
measure signal arrival times of said sampled signals, and measure at least one of characteristic pulse shape parameters and full integrals of said sampled signals,
determine, based on the signal arrival times, and based at least one of the characteristic pulse shape parameters and the full integrals of said sampled signals, if a gamma ray or a neutron is recorded within a predetermined time window after another gamma ray or neutron whether a neutron induced signal is recorded within a predetermined time window after a recorded gamma ray signal, if a neutron induced signal is recorded within the predetermined time window after a recorded gamma ray signal,
determine a rate of events when a neutron induced signal is recorded within a predetermined time window after a recorded gamma ray signal and determine whether said rate is significantly above the expected rate of background events without special nuclear materials, SNM, present in a field of view, FOV, and if so
issue an alarm indicating the presence of special nuclear materials ("SNM").

7. The radiation detecting system according to claim 6, wherein the processing circuitry is further configured to:
perform image reconstruction of the spatial distribution of material emitting coincident gamma rays and neutrons within the FOV based on accumulated neutron-gamma time difference spectra labeled by which detector of the first and second detector that was hit by a gamma ray and which detector of the first and second detector that was hit by a neutron and on information of neutron energies and neutron-gamma time differences measured event-by-event.

8. The radiation detecting system according to claim 7, wherein the processing circuitry is further configured to:
quantify an amount of SNM within the FOV based on the information on the spatial distribution and the predetermined detection efficiencies.

9. The radiation detecting system according to claim 6, wherein the processing circuitry is further configured to:
reconstruct at least one of a position and a spatial distribution of a source emitting time correlated gamma rays and neutrons using an artificial neural network trained on cumulative time difference spectra acquired from at least one known position of at least one SNM or other nuclear source of time-correlated gamma rays and neutrons in the FOV.

* * * * *